(12) United States Patent
Tani (10) Patent No.: US 9,184,827 B2
(45) Date of Patent: Nov. 10, 2015

(54) RELAY DEVICE AND AUXILIARY RELAY DEVICE

(75) Inventor: Shigenori Tani, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 174 days.

(21) Appl. No.: 13/990,914

(22) PCT Filed: Dec. 13, 2011

(86) PCT No.: PCT/JP2011/078825
§ 371 (c)(1),
(2), (4) Date: May 31, 2013

(87) PCT Pub. No.: WO2012/120743
PCT Pub. Date: Sep. 13, 2012

(65) Prior Publication Data
US 2013/0242857 A1    Sep. 19, 2013

(30) Foreign Application Priority Data

Mar. 4, 2011  (JP) .................................. 2011-047545

(51) Int. Cl.
H04B 7/185 (2006.01)
H04B 7/155 (2006.01)

(52) U.S. Cl.
CPC ............ *H04B 7/185* (2013.01); *H04B 7/15557* (2013.01)

(58) Field of Classification Search
None
See application file for complete search history.

(56) References Cited

U.S. PATENT DOCUMENTS

| | | | |
|---|---|---|---|
| 7,864,723 B2 | 1/2011 | Winkler et al. | |
| 2007/0086512 A1 | 4/2007 | Can et al. | |
| 2007/0190934 A1 | 8/2007 | Kim et al. | |
| 2008/0181318 A1 | 7/2008 | Kim et al. | |
| 2008/0205275 A1* | 8/2008 | Rinne et al. | 370/235 |
| 2009/0047898 A1 | 2/2009 | Imamura et al. | |
| 2009/0092072 A1* | 4/2009 | Imamura et al. | 370/315 |
| 2009/0227201 A1 | 9/2009 | Imai et al. | |
| 2010/0040119 A1 | 2/2010 | Miyoshi et al. | |
| 2010/0322441 A1* | 12/2010 | Weiss et al. | 381/120 |

FOREIGN PATENT DOCUMENTS

| | | |
|---|---|---|
| JP | 62 135028 | 6/1987 |
| JP | 2008 544719 | 12/2008 |
| JP | 2009 38678 | 2/2009 |
| WO | 2006 093286 | 9/2006 |
| WO | 2006 098273 | 9/2006 |
| WO | 2006 104105 | 10/2006 |

OTHER PUBLICATIONS

Yun, A., et al., "AMERHIS Next Generation Global IP Services in the Space," IEEE, pp. 169-176, (2010).

International Search Report Issued Jan. 24, 2012 in PCT/JP11/078825 Filed Dec. 13, 2011.

Extended Search Report issued Jun. 3, 2014 in European Patent Application No. 11860171.5.

* cited by examiner

*Primary Examiner* — Jeffrey M Rutkowski
*Assistant Examiner* — Ning Li
(74) *Attorney, Agent, or Firm* — Oblon, McClelland, Maier & Neustadt, L.L.P.

(57) ABSTRACT

A relay device that relays a signal in which a plurality of signals having respectively different frequencies are multiplexed between a first communication device on a transmission side and a second communication device on a reception side. The relay device includes: a demultiplexing unit; a relay-method decision unit; a signal regeneration unit; and a multiplexing unit. The demultiplexing unit demultiplexes a signal received from the first communication device to a plurality of frequencies. The relay-method decision unit decides which relay method is performed on a signal having been demultiplexed by the demultiplexing unit. The signal regeneration unit performs demodulation, decoding, coding, and modulation on a signal decided to undergo regenerative relay by the relay-method decision unit. The multiplexing unit multiplexes a signal decided to undergo transparent relay by the relay-method decision unit and a signal regenerated by the signal regeneration unit.

16 Claims, 5 Drawing Sheets

RELAY DEVICE AND AUXILIARY RELAY DEVICE

FIELD

The present invention relates to a relay device and an auxiliary relay device that is connected to a relay device in a wireless communication system via a relay device.

BACKGROUND

In recent years, there has been introduced a satellite communication system in which communication between two points, such as communication between a ship and an aircraft on the earth, is performed by using a satellite that operates on an earth orbit in the outer space. Such a satellite communication system is realized by receiving a signal transmitted from a communication apparatus on the earth by a relay incorporated in a satellite and transmitting (relaying) the signal to other communication apparatuses on the earth. In recent years, along with the increase of data capacity in the satellite communication system, multi-beam transmission that performs data transmission by beams different for regions has been studied. When this multi-beam transmission is realized by a through repeater satellite with conventional analog frequency conversion, as a frequency required for data transmission of an uplink (from a ground station to a satellite), frequencies corresponding to the number of beams need to be secured. To effectively utilize limited frequencies, a channelizer technique has been studied. This channelizer technique can significantly reduce a signal bandwidth required for an uplink by demultiplexing a signal received by a satellite to minimum frequency units, then distributing demultiplexed signals to transmission destination beams, and multiplexing the distributed signals. Furthermore, to prevent a deterioration in the line quality of an uplink due to rain and the like, there has been studied a regenerative relay technique of demodulating, decoding, coding, and modulating a signal received by a relay and then transmitting the signal to a ground station. Further, there has been disclosed a technique in which different communication services can be simultaneously relayed by combining the channelizer technique and the regenerative relay technique that are described above. For example, there has been studied a technique in which regenerative relay is not performed for a best effort service such as the Internet, and is performed only for communication services that require securement of reliability (see Patent Literature 1 and Non Patent Literature 1).

CITATION LIST

Patent Literature

Patent Literature 1: Japanese Patent Application National Publication No. 2008-544719

Non Patent Literature

Non Patent Literature 1: Yun, A.; Casas, O.; de la Cuesta, B.; Moreno, I.; Solano, A.; Rodriguez, J. M.; Salas, C.; Jimenez, I.; Rodriguez, E.; Jalon, A.; "AmerHis next generation global IP services in the space," Advanced satellite multimedia systems conference (asma) and the 11th signal processing for space communications workshop (spsc), 2010 $5^{th}$

SUMMARY

Technical Problem

The relay method using only a channelizer described above (hereinafter, "transparent relay") and the relay method described above that regenerates data during relay (hereinafter, "regenerative relay") have the following problems.

Because the transparent relay needs to secure a sufficient margin for a case where the line quality of an uplink is deteriorated because of rain and of inclination of a directional antenna, this margin is a surplus in a case where the line quality is not deteriorated such as a time of a fine weather. That is, under a fine weather, the amount of data that is originally transmittable by the surplus margin cannot be transmitted and the frequency usage efficiency is reduced. When the regenerative relay is used, while a margin for a case where the line quality of an uplink is deteriorated because of rain and inclination of a directional antenna does not need to be secured and thus high frequency usage efficiency can be realized, circuits of demodulation, decoding, coding, and modulation need to be incorporated in the satellite and these circuits need to be always operated at the time of relaying signals. Consequently, increases in the payload size of the satellite and its consumption power are incurred.

The technique described in Patent Literature 1 mentioned above is configured such that a relay method can be switched by incorporating both of the transparent relay and regenerative relay in a satellite. However, because the relay method is switched according to a control signal from a ground station, when the line quality momentarily changes, increase in the control signal amount is incurred. Furthermore, there is also a problem that when a relay cannot receive a control signal for some reason, the relay method cannot be switched.

The present invention has been achieved in view of the above problems, and an object of the present invention is to provide a relay device that can realize high frequency usage efficiency and can reduce its power consumption.

Solution to Problem

To solve the above problems and achieve the object a relay device that relays a signal in which a plurality of signals having respectively different frequencies are multiplexed between a first communication device on a transmission side and a second communication device on a reception side, the relay device includes: a demultiplexing unit that demultiplexes a signal received from the first communication device to a plurality of frequencies; a relay-method decision unit that decides which relay method is performed on a signal having been demultiplexed by the demultiplexing unit among a plurality of relay methods including regenerative relay and transparent relay; a signal regeneration unit that performs demodulation, decoding, recoding, and remodulation on a signal decided to undergo regenerative relay by the relay-method decision unit; and a multiplexing unit that multiplexes a signal decided to undergo transparent relay by the relay-method decision unit and a signal regenerated by the signal regeneration unit.

Advantageous Effects of Invention

According to the present invention, because switching between transparent relay and regenerative relay can be finely performed, the line capacity of an uplink can be increased as compared to a case where the relay device is configured such that only the transparent relay is performed, and its power consumption can be reduced as compared to a case where the relay device is configured such that only the regenerative relay is performed.

DESCRIPTION OF EMBODIMENTS

Exemplary embodiments of a relay device and an auxiliary relay device according to the present invention will be explained below in detail with reference to the accompanying drawings. The present invention is not limited to the embodiments.

First Embodiment

Figure 1:
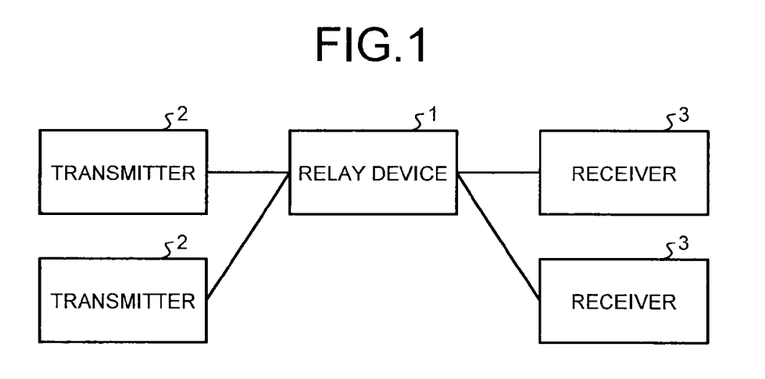
FIG. 1 is a configuration example of a satellite communication system according to a first embodiment.

FIG. 1 is a configuration example of a satellite communication system according to a first embodiment. In the satellite communication system, one or more transmitters 2 (a communication device on a transmission side) are wirelessly connected via a relay device 1 to one or more receivers 3 (a communication device on a reception side).

Figure 2:
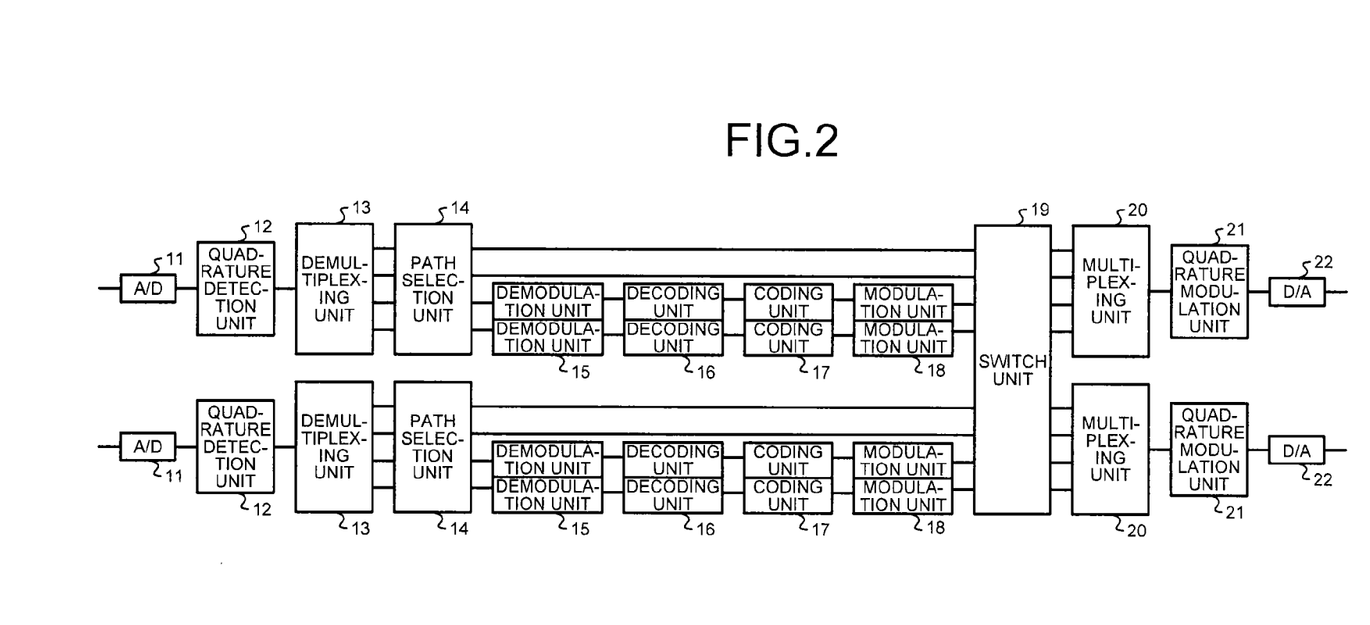
FIG. 2 is a configuration example of a relay device.

A configuration of the relay device 1 that constitutes the satellite communication system will be explained next. FIG. 2 is a configuration example of the relay device 1. The relay device 1 includes: an A/D (an AD conversion unit) 11; a quadrature detection unit 12; a demultiplexing unit 13; a path selection unit 14; a demodulation unit 15; a decoding unit 16; a coding unit 17; a modulation unit 18; a switch unit 19; a multiplexing unit 20; a quadrature modulation unit 21; and a D/A (a DA conversion unit) 22. The demodulation unit 15, the decoding unit 16, the coding unit 17, and the modulation unit 18 constitute a signal regeneration unit.

In the relay device 1 with the above configuration, an analog signal that is received from each of the transmitters 2 and present in different beams is converted into a digital signal by the A/D 11 allocated to each beam and the digital signal is mapped on a complex plane in the quadrature detection unit 12.

The demultiplexing unit 13 performs a demultiplexing process on a signal having undergone quadrature detection. For example, when one beam has a bandwidth of 10 megahertz and is demultiplexed to 1-MHz signals, a 10-MHz signal is demultiplexed to ten signals.

The path selection unit 14 that operates as a relay-method decision unit measures the line quality for each demultiplexed signal and transfers each demultiplexed signal to the switch unit 19 or the demodulation unit 15, which will be described later, according to the line quality. Operation details of the path selection unit 14 will be specifically described later.

The demodulation unit 15 demodulates a demultiplexed signal. While PSK (Phase Shift Keying), QAM (Quadrature Amplitude Modulation), and the like are known as the demodulation method; the relay device 1 can perform demodulation by a method same as a method by which the transmitter 2 performs modulation by using a demodulation method set in advance as a system or by a control unit (not shown) being notified of a demodulation method by a control device on the ground.

The decoding unit 16 decodes demodulated data. While turbo decoding, Viterbi decoding, and the like are known as a decoding method, the decoding unit 16 may perform decoding by the same method as a method by which the transmitter 2 performs coding similarly to the demodulation unit 15. Furthermore, when a CRC (Cyclic Redundancy Check) is applied to a transmitted signal, processes subsequent to the coding unit 17 may be stopped when a CRC result is NG (the signal cannot be decoded). With this configuration, the power consumption of the relay device 1 can be reduced.

The coding unit 17 codes the decoded data. While turbo coding, convolutional coding, and the like are known as a coding method, as long as a method by which the relay device 1 performs coding and a method by which the receiver 3 performs decoding are set in advance, data can be decoded in the receiver 3 by any method. Accordingly, the coding method does not necessarily need to be the same as the method performed by the transmitter 2 for coding.

The modulation unit 18 modulates coded data. Because data can be modulated in the receiver 3 by any method as long as a method by which the relay device 1 performs modulation and a method by which the receiver 3 performs demodulation are set in advance similarly to the coding unit 17, the modulation method does not necessarily need to be the same as the method performed by the transmitter 2 for modulation.

The switch unit 19 distributes a modulated signal (a signal generated by regenerating a demultiplexed signal) or a demultiplexed signal transferred from the path selection unit 14 to a relay-destination beam. A correspondence relationship between a modulated signal or a demultiplexed signal and a relay-destination beam may be set in advance in a system. Alternatively, a control unit (not shown) may receive control information that indicates the correspondence relationship from a control device on the ground to notify the switch unit 19 of the control information.

The multiplexing unit 20 multiplexes a modulated signal or a demultiplexed signal for each beam distributed by the switch unit 19. The quadrature modulation unit 21 performs quadrature modulation on a demultiplexed signal mapped on a complex plane. The D/A 22 converts a digital signal having undergone quadrature modulation into an analog signal.

Figure 3:
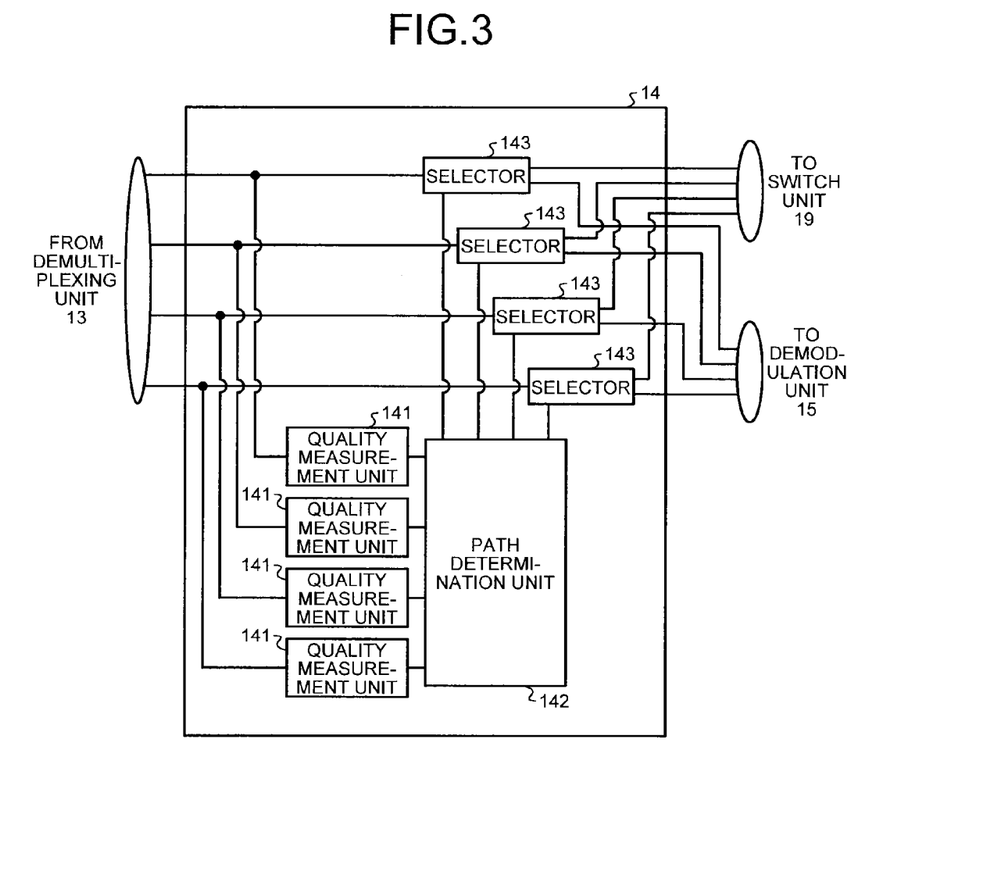
FIG. 3 is a configuration example of a path selection unit.

The path selection unit 14 that performs a characteristic operation in the relay device 1 according to the first embodiment will be explained next in detail. FIG. 3 is a configuration example of the path selection unit 14. The path selection unit 14 includes a quality measurement unit 141, a path determination unit 142, and a selector 143. FIG. 3 is an example of a case where quality measurement units 141 and selectors 143 respectively equal to the number of signals demultiplexed in the demultiplexing unit 13 (the maximum number of demultiplexed signals) are provided.

In the path selection unit 14, the quality measurement unit 141 measures the line quality of a demultiplexed signal received from the demultiplexing unit 13. As the line quality, for example, RSSI (Received Signal Strength Indicator) that indicates the intensity of a received signal, SINR (Signal to Noise Interference Ratio), and CINR (Carrier to Interference and Noise Ratio) are known, and any of them may be measured. While FIG. 3 is an example of a case where the quality measurement units 141 corresponding to the number of demultiplexed signals are arranged, as long as the line quality can be measured in a time series, the quality measurement units 141 corresponding to the number of demultiplexed signals do not need to be arranged. Furthermore, other than the line quality described above, the quality measurement unit 141 may also demodulate header information included in a demultiplexed signal, and the header information may include an allowable delay of a signal transmitted by the transmitter 2 and an index that indicates a priority at the time of relaying a signal to the receiver 3.

The path determination unit 142 determines whether a demultiplexed signal is transferred to the switch unit 19 or to the demodulation unit 15 based on information obtained from the quality measurement unit 141 (line quality information). A case of transferring a demultiplexed signal to the switch unit 19 corresponds to performing transparent relay, and a case of transferring a demultiplexed signal to the demodulation unit 15 corresponds to performing regenerative relay. The selector 143 outputs a demultiplexed signal input from the demultiplexing unit 13 to the switch unit 19 or to the demodulation unit 15 according to a determination result of the path determination unit 142.

A method in which the path determination unit 142 determines a transfer destination of a demultiplexed signal is described here.

(Method 1) For example, when the path determination unit 142 has a threshold (a threshold A) and a line quality obtained from the quality measurement unit 141 is equal to or larger than the threshold A, the path determination unit 142 instructs the selector 143 to perform "transparent relay". Meanwhile, when the line quality is less than the threshold A, the path determination unit 142 instructs the selector 143 to perform "regenerative relay".

(Method 2) Alternatively, when the path determination unit 142 has two thresholds (a threshold A and a threshold B, where threshold B<threshold A) and a line quality obtained from the quality measurement unit 141 is equal to or larger than the threshold A, the path determination unit 142 instructs the selector 143 to perform "transparent relay". When the line quality is less than the threshold A and equal to or larger than the threshold B, the path determination unit 142 instructs the selector 143 to perform "regenerative relay", and when the line quality is less than the threshold B, the path determination unit 142 instructs the selector 143 to "discard signal".

When a signal transmitted from the transmitter 2 is configured by a plurality of demultiplexed signals and a relationship between a number X of demultiplexing signals (demultiplexed signals) and a number Y of the demodulation units 15 subsequent to the path selection unit 14 is "X≤Y" (when all demultiplexed signals can be regenerated), the line quality used for the method 1 and the method 2 may be either of the followings.

(1) The line quality is determined as at least one of the line qualities of the respective demultiplexed signals.
(2) The line quality is determined as an average value of the line qualities of the respective demultiplexed signals.

When these line qualities are used, the path determination unit 142 sets transfer destinations of all demultiplexed signals to the same destination (the path determination unit 142 gives the same instruction to all of the selectors 143).

When the number (indicated by N) of the demodulation units 15 is smaller than the number of demultiplexing signals (demultiplexed signals), the path determination unit 142 instructs the selector 143 to perform "regenerative relay" on N signals from a signal having the least line quality (the worst line quality) among demultiplexing signals serving as candidates that the selector 143 is instructed to perform "regenerative relay" using the method 1 and the method 2, and instructs the selector 143 to perform "transparent relay" on other signals.

As the line quality (the line quality of each demultiplexed signal) used for the method 1 and the method 2, a quotient of a time average value of the line quality (an average value within a predetermined period of time in the past) and an instantaneous value (the instantaneous value/the time average value) may be used.

When allowable delay information or signal priority information is obtained from the quality measurement unit 141, a determination using an allowable delay instead of using the line quality may be performed in the method 1. When the allowable delay information is used and the number (N) of the demodulation units 15 is smaller than the number of demultiplexing signals, the path determination unit 142 instructs the selector 143 to perform "regenerative rely" on N signals from a signal having the largest allowable delay and to perform "transparent relay" on other signals. When the signal priority information is used and the number (N) of the demodulation units 15 is smaller than the number of demultiplexing signals, the path determination unit 142 instructs the selector 143 to perform "regenerative relay" on N signals from a signal having the highest priority and to perform "transparent relay" on other signals.

To synchronize the head of a data frame as a timing of starting demodulation or decoding when the path determination unit 142 gives instructions to the selector 143, a synchronization determination function may be provided to give instructions to the selector 143 when the head of the data frame is detected.

The path determination unit 142 may instruct the selector 143 about a signal-power adjustment amount according to a line quality value to adjust signal power of a demultiplexed signal in the selector 143. For example, when the line quality is sufficiently high, it is possible to perform transmission without any data errors even when transmission power at the time of transmission from the relay device 1 to the receiver 3 is reduced. Accordingly, by adjusting signal power so that data errors do not occur and reducing the transmission power of the relay device 1, the power consumption of the relay device 1 can be reduced.

The selector 143 processes a demultiplexed signal as follows according to an instruction from the path determination unit 142.

That is, when the path determination unit 142 instructs the selector 143 to perform "transparent relay", the selector 143 transfers a demultiplexed signal to the demodulation unit 15. When the path determination unit 142 instructs the selector 143 to perform "regenerative relay", the selector 143 transfers a demultiplexed signal to the switch unit 19. When the path determination unit 142 instructs the selector 143 to "discard signal", the selector 143 discards a demultiplexed signal and does not perform subsequent processes.

Figure 4:
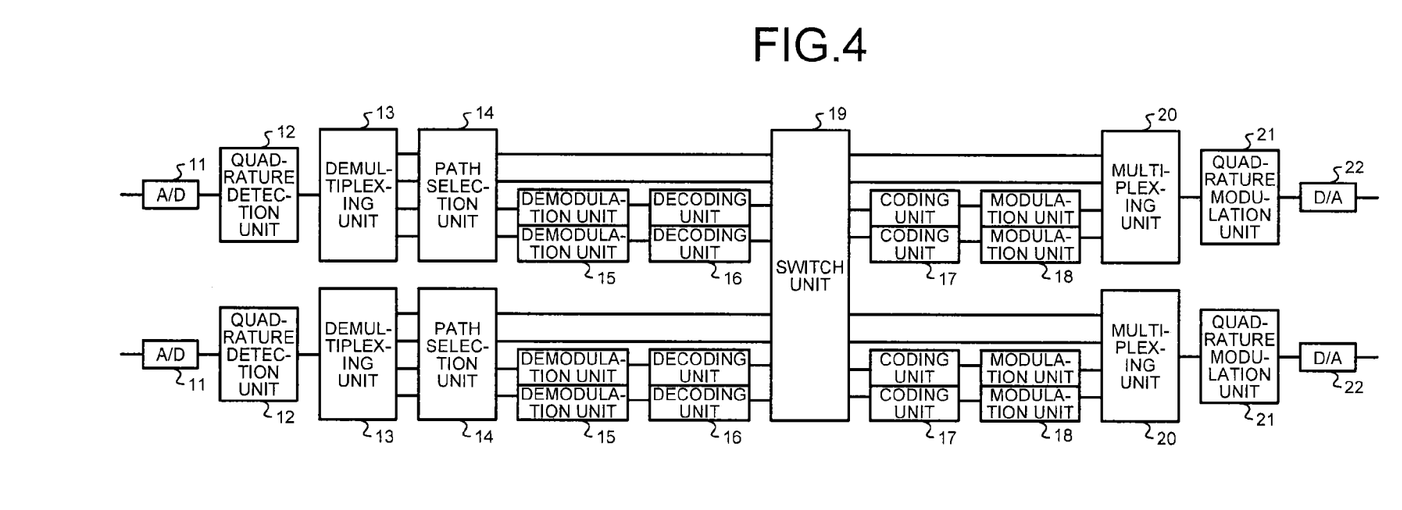
FIG. 4 is another configuration example of a relay device.

As another mode, as shown in FIG. 4, the switch unit 19 of the relay device 1 may be arranged between the decoding unit 16 and the coding unit 17. In this case, when the transmitter 2 has transfer-destination beam information of data included in the data, the decoding unit 16 can be aware of the transfer-destination beam information. Therefore, finer relay can be realized as compared to the configuration of FIG. 2.

As explained above, according to the first embodiment, in a process of the relay device 1 relaying a signal received from the transmitter 2 to the receiver 3, the path selection unit 14 within the relay device 1 measures the line quality of an uplink and transfers a demultiplexed signal to the switch unit 19 or the demodulation unit 15 (adaptively selects whether a received signal is relayed without being regenerated or a received signal is regenerated and then relayed) according to the line quality. Accordingly, even when the line quality of the uplink varies because of rain attenuation and the like, the relay device 1 can finely switch between "transparent relay" and "regenerative relay", and thus the line capacity of the uplink can be increased as compared to a case of configuring a relay device such that only transparent relay is performed. Furthermore, the power consumption can be reduced as compared to a case of configuring a relay device such that only regenerative relay is performed. The size of a modulation/demodulation circuit to be incorporated in a relay device can be reduced as compared to the case of configuring the relay device such that only regenerative relay is performed.

Second Embodiment

In the first embodiment, the demodulation unit 15, the decoding unit 16, the coding unit 17, and the modulation unit 18 are incorporated in the relay device 1; and the path selection unit 14 determines whether transparent relay is performed or regenerative relay is performed. However, when a demand for a new communication system (a coding system, a modulation system) is increased after the relay device 1 is launched, the relay device 1 cannot support the new communication system. As a solution to this problem, a software wireless technique of incorporating a rewritable device into the relay device 1 for supporting a new communication system has been studied. However, because the absolute processing capability of the relay device 1 does not change, the relay device 1 cannot necessarily support the new communication system.

In the second embodiment, in connection to the above problem, a method of increasing the processing capability of the relay device 1 and supporting different communication systems after the relay device 1 is launched is explained.

Figure 5:
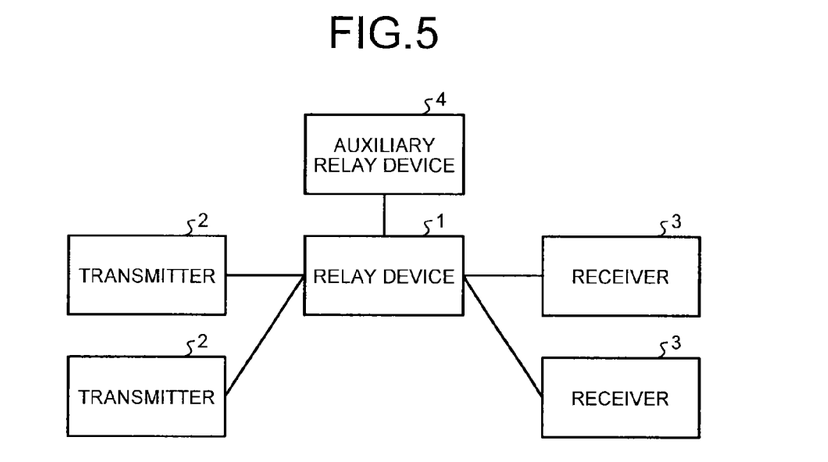
FIG. 5 is a configuration example of a satellite communication system according to a second embodiment.

FIG. 5 is a configuration example of a satellite communication system according to a second embodiment. Similarly to the first embodiment, in the satellite communication system according to the present embodiment, one or more transmitters 2 and one or more receivers 3 are wirelessly connected via the relay device 1 to each other. The relay device 1 is also wirelessly connected to one or more auxiliary relay devices 4. It is assumed that the auxiliary relay device 4 is launched by another method after the relay device 1 is launched and remains in a relatively still state while being adjacent to the relay device 1. Any method may be used for a communication system between the relay device 1 and the auxiliary relay device 4.

Figure 6:
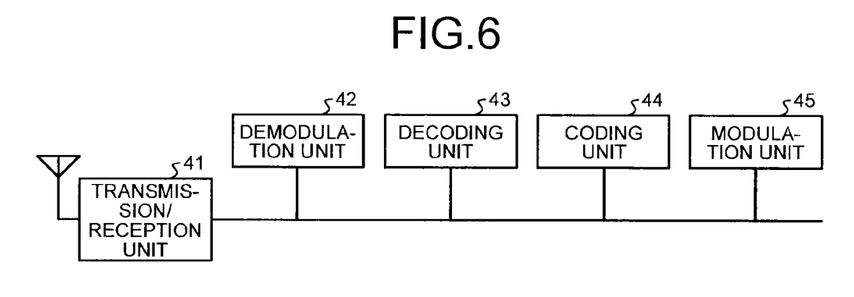
FIG. 6 is a configuration example of an auxiliary relay device.

A configuration of the auxiliary relay device 4 will be explained. FIG. 6 is a configuration example of the auxiliary relay device 4. The auxiliary relay device 4 includes a transmission/reception unit 41, a demodulation unit 42, a decoding unit 43, a coding unit 44, and a modulation unit 45.

The configuration of the relay device 1 is the same as that of the first embodiment except that a function of communicating with the auxiliary relay device 4 is added thereto. Accordingly, elements different from those of the first embodiment are explained here.

An operation of the satellite communication system according to the second embodiment is explained next.

In the path selection unit 14 of the relay device 1, the path determination unit 142 instructs the selector 143 to perform "transparent relay" and "regenerative relay", and to "discard signal" by the same method as that of the first embodiment. When the selector 143 is instructed to perform "transparent relay", the selector 143 transfers a demultiplexed signal to the switch unit 19. Meanwhile, when the selector 143 is instructed to perform "regenerative relay", the selector 143 transfers a demultiplexed signal to a transmission/reception function unit (not shown) used for communicating with the auxiliary relay device 4. That is, according to the present embodiment, when the path selection unit 14 decides that a demultiplexed signal received from the demultiplexing unit 13 undergoes "regenerative relay", the path selection unit 14 transmits the demultiplexed signal to the auxiliary relay device 4 but not to the subsequent demodulation unit 15.

In the auxiliary relay device 4, the transmission/reception unit 41 receives a demultiplexed signal from the relay device 1 and the demodulation unit 42 performs a demodulation process on a signal received from the relay device 1. Subsequently, the decoding unit 43 decodes demodulated data, the coding unit 44 codes the decoded data, and the modulation unit 45 modulates coded data. A modulation signal is then transferred via the transmission/reception unit 41 to the relay device 1. It is assumed that the coding unit 44 and the modulation unit 45 support a coding system and a modulation system different from those of the coding unit 17 and the modulation unit 18 of the relay device 1, respectively.

The relay device 1 transfers modulation data received from the auxiliary relay device 4 to the switch unit 19 and performs the same process as that of the first embodiment thereafter.

While the configuration of FIG. 6 and the above explanations assume a case of incorporating functions of demodulation, decoding, coding, and modulation in the auxiliary relay device 4, all these functions do not necessarily need to be incorporated in the auxiliary relay device 4 and only a part of these functions may be incorporated therein. For example, it may be configured such that demodulation and decoding are performed in the relay device 1, decoded data is transferred to the auxiliary relay device 4, and the auxiliary relay device 4 performs only coding and modulation. Furthermore, the auxiliary relay device 4 may be configured by wirelessly connecting a plurality of devices to each other. For example, demodulation and decoding may be realized in different auxiliary relay devices 4. In this case, it may be configured such that a demultiplexed signal transferred from the relay device 1 is demodulated in a first auxiliary relay device and a demodulated signal is wirelessly transferred to the second auxiliary relay device 4 and the signal is decoded therein.

As explained above, the second embodiment is configured such that the auxiliary relay device 4 is wirelessly connected to the relay device 1. Furthermore, it is configured such that a demultiplexed signal is transferred from the relay device 1 to the auxiliary relay device 4 and a process from demodulation to modulation is performed in the auxiliary relay device 4. With this configuration, even when there occurs a need to support a new communication system after the relay device 1 is launched, by launching the auxiliary relay device 4, relay can be easily performed by a different communication system. Furthermore, because the auxiliary relay device 4 does not need to perform data communication with a ground station and it suffices that only communication between the relay device 1 and the auxiliary relay device 4 is realized, an antenna and an amplifier required for data transmission and reception can be downsized as compared to the relay device 1.

INDUSTRIAL APPLICABILITY

As described above, the relay device according to the present invention is useful for a case where a wireless signal is relayed between a transmitter and a receiver, and is particularly suitable for a relay device that performs transparent relay and regenerative relay adaptively.

REFERENCE SIGNS LIST 1 relay device
2 transmitter
3 receiver
4 auxiliary relay device
11 A/D (AD conversion unit)
12 quadrature detection unit
13 demultiplexing unit
14 path selection unit
15, 42 demodulation unit
16, 43 decoding unit
17, 44 coding unit
18, 45 modulation unit
19 switch unit
20 multiplexing unit
21 quadrature modulation unit
22 D/A (DA conversion unit)
41 transmission/reception unit
141 quality measurement unit
142 path determination unit
143 selector

The invention claimed is:

1. A relay device that relays a signal in which a plurality of signals having respectively different frequencies are multiplexed between a first communication device on a transmission side and a second communication device on a reception side, the relay device comprising:
    demultiplexing circuitry that demultiplexes a signal received from the first communication device to a plurality of frequencies;
    relay-method decision circuitry that decides which relay method is performed on a signal having been demultiplexed by the demultiplexing circuitry from among a plurality of relay methods, including regenerative relay applied to a signal having a line quality less than a first predetermined threshold and transparent relay applied to a signal having a line quality equal to or larger than the first predetermined threshold;
    signal regeneration circuitry that performs demodulation, decoding, coding, and modulation on a signal decided to undergo regenerative relay by the relay-method decision circuitry; and
    multiplexing circuitry that multiplexes a signal decided to undergo transparent relay by the relay-method decision circuitry and a signal regenerated by the signal regeneration circuitry,
    wherein the relay-method decision circuitry has an input portion connected to the demultiplexing circuitry and an output portion connected to the signal regeneration circuitry and the multiplexing circuitry,
    wherein the relay-method decision circuitry includes:
        a line-quality measurement sub-circuitry portion that measures a line quality of each of a plurality of demultiplexed signals, which are the signals having been demultiplexed, and
        a decision sub-circuitry portion that decides a relay method of each of the demultiplexed signals based on the line quality, and
    wherein the decision sub-circuitry portion decides to perform regenerative relay on a signal having a line quality less than the first predetermined threshold and equal to or larger than a second predetermined threshold, less than the first predetermined threshold, among the demultiplexed signals, and decides not to relay and to discard a signal having a line quality less than the second predetermined threshold among the demultiplexed signals.

2. The relay device according to claim 1, wherein, when the signal received from the first communication device is comprised of a plurality of demultiplexing signals, at least one of line qualities of the respective demultiplexing signals is used as the line quality.

3. The relay device according to claim 1, wherein, when the signal received from the first communication device is comprised of a plurality of demultiplexing signals, an average value of line qualities of the respective demultiplexing signals is used as the line quality.

4. The relay device according to claim 1, wherein, when a number N of the signal regeneration circuitry is smaller than a number M of signals having been demultiplexed by the demultiplexing circuitry, the decision circuitry decides to perform regenerative relay on N signals from a signal having a least line quality among signals having been demultiplexed by the demultiplexing circuitry, M being a non-zero integer greater than 1 and N being non-zero integer.

5. The relay device according to claim 1, wherein, when a number N of the signal regeneration circuitry is smaller than a number M of signals having been demultiplexed by the demultiplexing circuitry and number of signals satisfying a condition that the line quality is less than the first predetermined threshold is larger than N, the decision circuitry decides to perform regenerative relay on N signals from a signal having a least line quality among signals satisfying the condition, M being a non-zero integer greater than 1 and N being non-zero integer.

6. The relay device according to claim 1, wherein, when a number N of the signal regeneration circuitry is smaller than a number M of signals having been demultiplexed by the demultiplexing circuitry and number of signals satisfying a condition that the line quality is less than the first predetermined threshold and equal to or larger than the second predetermined threshold is larger than N, the decision circuitry decides to perform regenerative relay on N signals from a signal having a less line quality among signals satisfying the condition, M being a non-zero integer greater than 1 and N being non-zero integer.

7. The relay device according to claim 1, wherein the line quality is a quotient of a time average value of a line quality and an instantaneous value.

8. The relay device according to claim 1, wherein the decision circuitry is configured to decide a relay method of each of the demultiplexed signals using allowable delay information of a received signal from the first communication device instead of using the line quality.

9. The relay device according to claim 1, wherein the decision circuitry is configured to decide a relay method of each of the demultiplexed signals using priority information of a received signal from the first communication device instead of using the line quality.

10. The relay device according to claim 1, wherein the decision circuitry adjusts power of each of the demultiplexed signals based on the line quality.

11. The relay device according to claim 1, wherein the output portion of the relay-method decision circuitry is connected to the multiplexing circuitry via switch circuitry.

12. The relay device according to claim 1, wherein the output portion of the relay-method decision circuitry is connected to the multiplexing circuitry via switch circuitry and separately via the signal regeneration circuitry and the switch circuitry.

13. A relay system comprising:
a relay device that relays a signal in which a plurality of signals having respectively different frequencies are multiplexed between a first communication device on a transmission side and a second communication device on a reception side; and
an auxiliary relay device wirelessly connected to the relay device,
wherein the relay device includes:
demultiplexing circuitry that demultiplexes a signal received from the first communication device to a plurality of frequencies;
relay-method decision circuitry that decides which relay method is performed on a signal having been demultiplexed by the demultiplexing circuitry from among a plurality of relay methods, including regenerative relay applied to a signal having a line quality less than a first predetermined threshold and transparent relay applied to a signal having a line quality equal to or larger than the first predetermined threshold;
signal regeneration circuitry that performs demodulation, decoding, coding, and modulation on a signal decided to undergo regenerative relay by the relay-method decision circuitry; and
multiplexing circuitry that multiplexes a signal decided to undergo transparent relay by the relay-method decision circuitry and a signal regenerated by the signal regeneration circuitry,
wherein the auxiliary relay device receives a signal decided to undergo regenerative relay by the relay-method decision circuitry and performs at least one or more of demodulation, decoding, coding, and modulation on the signal, thereby regenerating a signal having a communication system different from that of a signal regenerated by the signal regeneration circuitry and transmitting the signal to the relay device, and
wherein the relay-method decision circuitry has an input portion connected to the demultiplexing circuitry and an output portion connected to the signal regeneration circuitry and the multiplexing circuitry,
wherein the relay-method decision circuitry includes:
a line-quality measurement sub-circuitry portion that measures a line quality of each of a plurality of demultiplexed signals, which are the signals having been demultiplexed, and
a decision sub-circuitry portion that decides a relay method of each of the demultiplexed signals based on the line quality, and
wherein the decision sub-circuitry portion decides to perform regenerative relay on a signal having a line quality less than the first predetermined threshold and equal to or larger than a second predetermined threshold, less than the first predetermined threshold, among the demultiplexed signals, and decides not to relay and to discard a signal having a line quality less than the second predetermined threshold among the demultiplexed signals.

14. The relay system according to claim 13, wherein the auxiliary relay device is configured by wirelessly connecting a plurality of devices having a function of performing at least one or more of demodulation, decoding, coding, and modulation.

15. The relay system according to claim 13, wherein the output portion of the relay-method decision circuitry is connected to the multiplexing circuitry via switch circuitry.

16. The relay system according to claim 13, wherein the output portion of the relay-method decision circuitry is connected to the multiplexing circuitry via switch circuitry and separately via the signal regeneration circuitry and the switch circuitry.

* * * * *